United States Patent [19]

Morris et al.

[11] 4,184,411
[45] Jan. 22, 1980

[54] SEAL RING FOR CYLINDER HEAD OF PISTON PUMPS

[75] Inventors: Dow V. Morris; Robert J. Glahn, both of Tulsa, Okla.

[73] Assignee: Wheatley Company, Tulsa, Okla.

[21] Appl. No.: 766,338

[22] Filed: Feb. 7, 1977

[51] Int. Cl.² .................. F16J 10/04; B65D 53/02
[52] U.S. Cl. ................................. 92/171; 277/170; 277/179; 220/378
[58] Field of Search .......... 277/179, 170; 92/171; 417/437; 220/378

[56] References Cited

U.S. PATENT DOCUMENTS

| | | | |
|---|---|---|---|
| 2,477,533 | 7/1949 | Whiting | 277/170 |
| 2,697,623 | 12/1954 | Mosher | 277/179 |
| 2,797,944 | 7/1957 | Reising | 277/179 |
| 2,842,284 | 7/1958 | Flick | 220/378 |
| 2,856,249 | 10/1958 | Leman | 92/171 |
| 2,966,376 | 12/1960 | Reynolds | 277/179 |
| 2,981,575 | 4/1961 | Leman | 92/171 |
| 3,020,054 | 2/1962 | Driancourt | 277/170 |
| 3,144,162 | 8/1964 | Morris | 220/378 |
| 3,214,181 | 10/1965 | Rood | 277/170 |
| 3,307,735 | 3/1967 | Latham et al. | 220/378 |
| 3,362,568 | 1/1968 | Brandt et al. | 220/378 |
| 3,499,655 | 3/1970 | Czernik et al. | 92/171 |
| 3,568,573 | 3/1971 | Bailey | 92/171 |
| 3,620,556 | 11/1971 | Paddington | 277/179 |
| 3,741,615 | 6/1973 | Otto | 277/179 |
| 4,029,294 | 6/1977 | McCaskill | 220/378 |

FOREIGN PATENT DOCUMENTS 752605  7/1956  United Kingdom .................. 92/171

Primary Examiner—William L. Freeh

[57] ABSTRACT

A pump is shown with a sealing means for providing static seals along liners slidably receiving the pistons of the pump. The sealing means includes a metal cylindrical ring having a generally wedge-shaped outer edge. In the wedge-shaped outer edge is bonded a resilient sealing material, which sealing material extends outwardly from the metal ring at a small angle. The resilient sealing material also extends beyond one end of the metal ring with an undercut on the innermost edge of the resilient material. After assembly, the metal ring provides a stiff assembly necessary for intermittent operation of the pump in climates having large temperature variations. The resilient sealing material provides sealing along two adjacent surfaces of the liners. Other seals along the liner may be replaced to include combinations of metal for stiffness and resilient material for sealing.

8 Claims, 5 Drawing Figures

SEAL RING FOR CYLINDER HEAD OF PISTON PUMS

BACKGROUND OF THE INVENTION

The present invention relates to seals and, more particularly, to seals designed for sealing in the cylinder head of piston pumps. The seals are particularly designed to provide stiffness of assembly necessary for pumps used in intermittent operation in climates having large temperature variations. Stiffness in the assembly of the pump is necessary to prevent breakage or metal fatigue caused by varying coefficients of expansion of different component parts of the pump.

BRIEF DESCRIPTION OF THE PRIOR ART

Prior to the present invention, many different types of sealing arrangements have been used to seal along the liners of piston operated pumps. The traditional duck-and-Buna seals that have rather large cross-sectional areas are suited for use in the ambient temperatures commonly found in the mid-continent of North America. However, as pumping devices are used in colder climates, such as Canada or Alaska, problems have occured either in seal leakage or breaking of components of the pump. The leakage or breakage is due to a lack of stiffness in the makeup of the liner of the pump at colder temperatures. Large changes in temperature may cause a reduction in the preloading of bolts which results from differences in coefficients of expansion. The stress caused by high-cyclic pressures will many times result in damage from metal fatigue and/or breakage of bolts due to inadequate preloading under colder temperatures.

Various types of seals have been used in the past including tongue-and-groove joints with the seal being located in the groove. For static seals, simple gaskets are used between flat surfaces with a predetermined load being required on the gasket surface.

Many different types of pumps with their own individual sealing means have been used in the past, particularly in drilling operations. For example in Schaaf (U.S. Pat. No. 3,438,334) a type of stuffing box packing is used to seal along the sleeve or liner for the pump. Around the cover a stepped bore and further packing is used for sealing.

Perhaps one of the closer references known to applicant is Leman (U.S. Pat. No. 2,981,575) wherein metal-to-metal contact exists in the assembly of the liner and liner retainer. Wedge-shaped angular packings are used to seal around the cover and along the outer edge of the liner. The angular packing, however, does not show any type of undercut or outward extension that would provide compressability for better sealing while still allowing good metal-to-metal contact.

Many of the seals used in prior pumps would have a tendency to "cold flow" or crack due to the varying cyclic pressure of the pump. To prevent the "cold flow" of the seal, it is necessary that the seal be rigidly confined on all surfaces. Any significant clearance between metal-to-metal components upon assembly has been found to be very detrimental to the life of the seal.

SUMMARY OF THE INVENTION

It is an object of this invention to provide a seal ring for the cylinder head of piston type pumps.

It is another object of the present invention to provide a means for sealing the cylinder head of piston type pumps with a sufficient degree of stiffness in the seal joint so that the pump may be operated intermittently over a wide range of temperatures without metal fatigue, leakage or other failures.

It is yet another object of the present invention to provide a seal ring including a metal portion having one corner cut therefrom, and a resilient sealing material bonded to the corner cut from the seal ring.

In assembly of the cylinder head of piston type pumps, a seal ring is held in position by the cylinder head by a given preloading. The seal ring has a generally cylindrical metal portion and a resilient sealing portion bonded to one wedge-shaped corner cut in the metal portion. Metal-to-metal contact between the seal ring and the cylinder head prevents the loosening of the assembly even during intermittent use over a wide range of ambient temperatures. The wedge-shaped cut is filled with a resilient elastomer sealing substance that extends outward from the outside diameter of the metal portion at a slight angle. Also the resilient sealing portion extends beyond the end of the metal portion, which is the end having the wedge-shaped cut therein. The resilient sealing portion has an undercut on its innermost edge to allow the resilient sealing portion to be compressed. When the metal portion and the resilient sealing portion are secured in position, the metal portion and the resilient sealing portion are basically cylindrical shaped. Another seal along the liner of the pump may be formed from a second metal ring having O-rings in each end thereof for sealing along the liner. The metal is given the required degree of stiffness for the intermittent operation over a wide range of ambient temperatures.

DESCRIPTION OF THE PREFERRED EMBODIMENT

Figure 1:
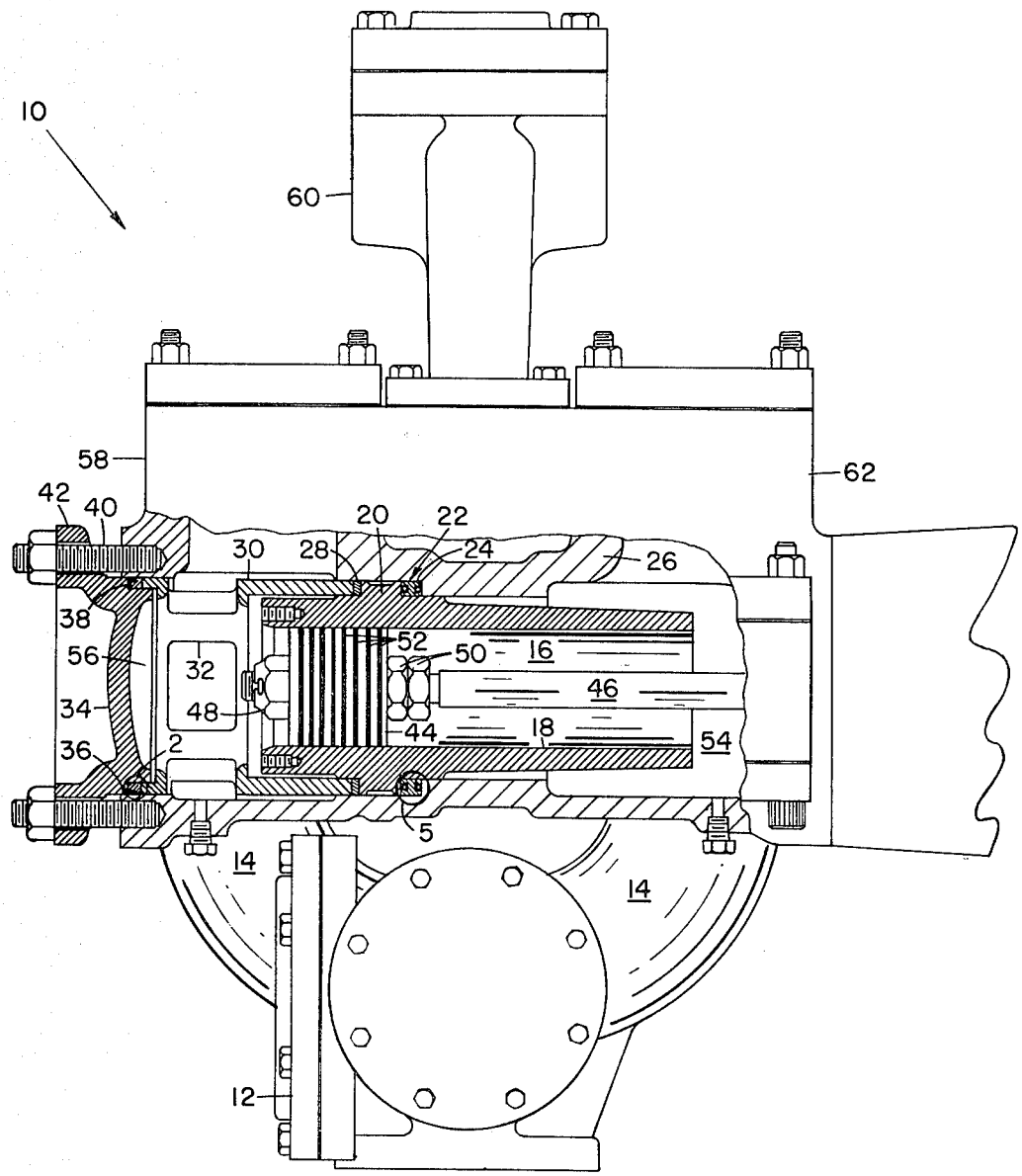
FIG. 1 is a partial sectional view along a cylinder of a fluid end assembly of a duplex piston pump using a seal ring as described herein.

Referring now to FIG. 1 of the drawings, there is shown a fluid end assembly of a piston type pump represented generally by reference numeral 10. The fluid and assembly 10 has a partial sectional view along one of its duplex cylinders. The fluid end assembly 10 has a suction flange 12 for drawing fluid to be pumped into the fluid end assembly 10. From the suction flange 12, fluid may flow through duplex suction manifolds 14 to intake valves (not shown due to the cut-away section). The intake valves connect to the appropriate side of the cylinder 16.

Inside of the cylinder 16 is located a liner 18 having a flange 20 extending radially outward therefrom. One end of the flange 20 abuts liner seal ring 22. Liner seal ring 22 in turn abuts shoulder 24 of the cylinder housing 26. At the other end of the flange 20 of liner 18 is located a liner spacer 28. The liner 18, liner seal ring 22 and liner spacer 28 are all held in position by liner retainer 30 abutting liner spacer 28. The liner retainer 30, while having holes 32 located therein for the flow of fluid to cylinder 16, is held in position by the cylinder head 34. The cylinder head 34 is designed to be received inside of cylinder opening 36 and to press seal ring 38 against the end of liner retainer 30. The cylinder head 34 is tightened into position by means of a predetermined torque on bolts 40 that extend through a cylinder head flange 42 into the cylinder housing 26.

Inside of the liner 18 is located the piston 44 which is held in position on piston rod 46 by means of cap nut 48 and locking nuts 50. The piston 44 seals with the internal surface of the liner 18 by means of piston rings 52. While the driving force for operating the piston rod 46 is not shown, any type of driving force as is common in piston pumps may be used to operate the piston rod 46. By an oscillating movement of the piston rod 46 along the axis of liner 18, the piston 44 will also oscillate along the axis of the liner 18. Movement of the piston 44 to the left will cause fluid to be drawn into chamber 54 through the intake valves (not shown), and simultaneously cause fluid contained in chamber 56 to be discharged through outlet valve 58 which connects to a discharge outlet 60. When the piston 44 moves to the right, fluid will be drawn into chamber 56 through the inlet valve (not shown), and fluid in chamber 54 will be discharged through outlet valve 62 which also connects to discharge outlet 60.

For pump operation in normal temperate zones of mid-continent of North America, the liner seal ring 22 and the seal ring 38 would normally consist of duck-and-Buna type seals that would simply be compressed between the abutting shoulders. However, if the pump with its fluid end assembly 10 was to be intermittently used in areas having a wide range of ambient temperatures, particularly areas closer to the North Pole than mid-continent of North America, then the common duck-and-Buna seals become ineffective. Different coefficients of expansion exist for the duck-and-Buna seals and the metal components of the pump. Because of the different coefficients of expansion, the tightness of the cylinder head 34 may vary with the temperature changes. If the preload on the bolts 40 of the cylinder head 34 varies due to the variation in the tightness of the assembly caused by differences in coefficients of expansion, failures will be caused due to metal fatigue. For example, the cylinder head 34 will have a tendency to bow as a result of cyclic pressure inside of chamber 56 of cylinder 16. The bowing of the cylinder head 34 will in turn cause an oscillatory bending of bolts 40 subsequently resulting in a breakage due to metal fatigue.

Figure 3:
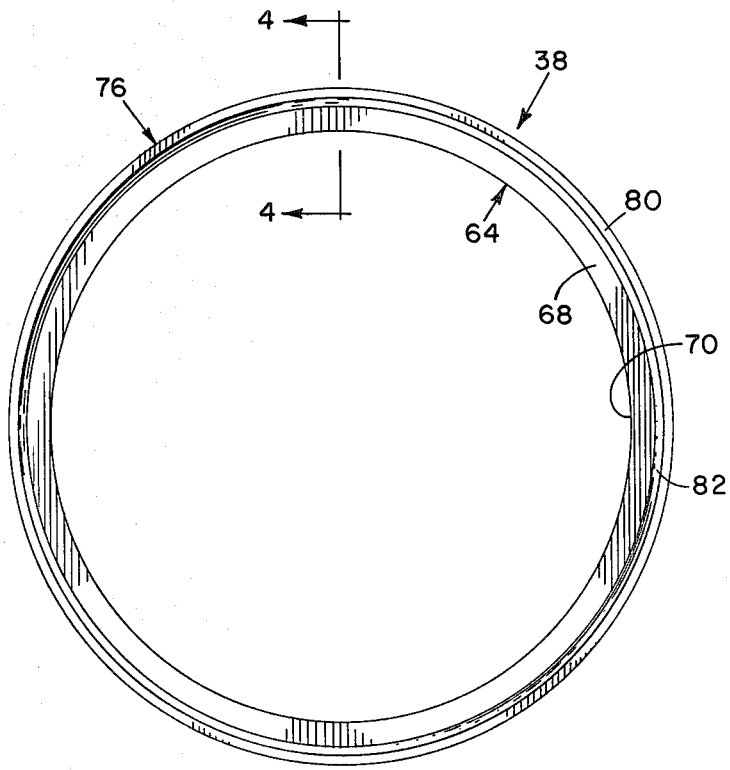
FIG. 3 is an elevated non-assembly view of the seal ring shown in FIG. 1.
Figure 4:
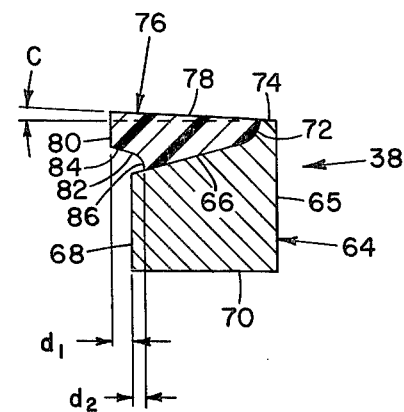
FIG. 4 is an enlarged cross-sectional view of FIG. 3 along section lines 4—4.

Referring now to FIGS. 3 and 4 in combination, there is shown seal ring 38 in elevated and enlarged cross-sectional views, respectively. The seal ring 38 includes a metal cylindrical portion 64 having a wedge-shaped surface 66 cut from one of the outermost corners of the seal ring 38. The wedge-shaped surface 66 extends from the top 68 of the seal ring 38 at a predetermined angle with respect to the inner surface 70. The lower end of the wedge-shaped surface 66 has a radius 72 so that the wedge-shaped surface 66 terminates approximately perpendicular to the outer surface 74.

Bonded to the wedge-shaped surface 66 is a resilient elastomer material 76 such as rubber or a rubber substitute with a fibrous material embedded therein for additional strength. The resilient material 76 has an outer surface 78 that extends outward at an angle "c" from the lowermost portion of the elastomer material 78 (which is flush with outer surface 74) to the top 80 thereof. The top 80 of the resilient material 76 extends above the top 68 of the metal cylinder portion 64 by a distance $d_1$. The resilient material 76 has an undercut 82 defined by a conical surface 84 with an inner radius 86 for terminating substantially perpendicular to the wedge-shaped surface 66. The termination of the inner radius 86 is below the top 68 by a distance $d_2$.

Figure 2:
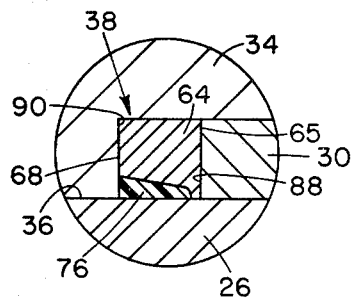
FIG. 2 is an enlarged sectional view of a portion of FIG. 1 shown in circle "2".

Referring now to FIGS. 2 and 4 in combination with FIG. 1, the seal ring 38 is shown tightened into position by the cylinder head 34. The bottom 65 of the metal cylinder portion 64 abuts the end 88 of the liner retainer 30. The top 68 of the metal portion 64 abuts shoulder 90 of cylinder head 34. By applying sufficient torque on the bolts 40, the cylinder head 34 is tightened into position so that the resilient elastomer material 76 is deformed as shown in FIG. 2. The undercut 82 allows for the compression of the resilient material 76. By having the angle "c" in the resilient material, and by having a top 80 thereof a distance $d_1$ above the top 68 of the metal cylinder portion 64, a good seal is made with the shoulder 90 and the cylindrical opening 36 of the housing 26. Due to bonding of the resilient material 76 to the metal cylindrical portion 64, no fluid will leak between the metal cylindrical portion 64 and the resilient material 76.

Figure 5:
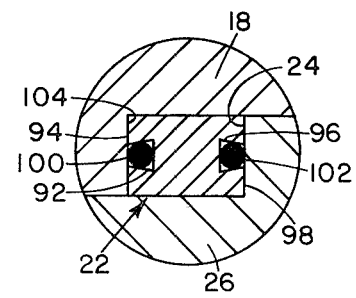
FIG. 5 is an enlarged sectional view of a portion of FIG. 1 shown in circle "5".

Referring to FIG. 5 in combination with FIG. 1, the liner seal ring 22 is shown in more detail. The liner seal ring 22 is cylindrical in shape with a groove 92 being cut in the top 94 and a groove 96 being cut in the bottom 98. Inside of grooves 92 and 96 are contained O-ring seals 100 and 102, respectively. O-ring seal 100 seals between the top 94 of the liner seal ring 22 and shoulder 104 of angular flange 20 of liner 18. O-ring 102 seals between the bottom 98 of liner seal ring 22 and shoulder 24 of cylinder housing 26. By use of the liner seal ring 22 as just described, no leakage occurs between liner 18 and housing 26 during the pumping action of the piston 44, even during intermittent use over a wide range of ambient temperatures.

By use of the seal ring 38 as described hereinabove, sealing occurs between two perpendicular surfaces, namely shoulder 90 of cylinder head 34 and cylinder opening 36 of housing 26. Simultaneously, by tightening the bolts 40 to a predetermined force, metal-to-metal contact exists from the cylinder head 34, seal ring 38, liner retainer 30, liner spacer 28, liner 18 and liner seal ring 22 to housing 26. The metal-to-metal contact between all of the surfaces gives the required degree of stiffness necessary for intermittent operation over a wide range of temperature variations. All of the metal components just mentioned have approximately the same coefficients of expansion, therefore, the amount of preload torque on bolts 40 will be maintained even in extremely cold weather. The resilient material 76, as deformed into the space left by the wedge-shaped surface 66, will provide a good seal even under large temperature variations. Likewise, the O-ring seals 100 and 102 provide good sealing along the liner 18. By use of the seals just described, the degree of stiffness necessary to prevent metal fatigue can be provided for intermittent operation over a wide range of ambient temperatures.

We claim:

1. An improved dual action piston type pump having a means for driving a piston rod with a piston attached thereto, a housing with a cylinder means surrounding said piston in said housing, said housing having inlet means and outlet means and corresponding inlet valve means and outlet valve means, respectively, connected to said cylinder means, cylinder head means and bolt means for attaching to said housing to cover one end of said cylinder means, liner means in said cylinder means, liner retainer means between said liner means and said cylinder head means, said improvement comprising:

a seal ring abutting said cylinder head means and said liner retainer means to provide a metal-to-metal seal, said seal ring having a substantially circular metal portion with a resilient portion being bonded to an outer edge and at one end thereof for sealing along a wall of said cylinder means and against said cylinder head means which contain the resilient portion in axial and radial directions; and upon tightening said cylinder head by said bolt means, stiffness of connection being provided for intermittent operation over a wide range of ambient temperatures to seal along said cylinder means and to avoid metal fatigue;

said metal portion of said seal ring has a wedge-shaped outer surface, said resilient portion extending outwardly from said wedge-shaped outer surface so that it must be compressed against the wall surface of said cylinder means for insertion of the seal and beyond said one end of said metal portion so that it will be compressed upon axial sealing compression and a relief groove in said resilient portion located between said outwardly extending resilient portion and said wedge-shaped outer surface for receiving the outwardly extending portion of the resilient portion upon sealing compression of the resilient portion, to form a radial sealing surface when the seal is axially compressed upon filing of the relief groove while providing the metal-to-metal seal to provide a positive mechanical seal without any voids unfilled by said resilient portion and so that extrusion does not occur as the flange cover is tightened against the seal.

2. The improved dual action piston type pump is recited in claim 1 wherein said relief groove of said resilient portion is undercut adjacent to said metal portion on said one end, said undercut permitting deformation of said resilient portion to allow metal-to-metal contact between said cylinder head means and said liner retainer means to give said stiffness of connection and so that extrusion does not occur as the flange cover is tightened against the seal.

3. The improved dual action piston type pump as recited in claim 2 wherein said metal portion is generally cylindrical shaped except said wedge-shaped outer surface that extends from said one end thereof at an angle and terminates approximately perpendicular to said outer edge thereof through a radius.

4. The improved dual action piston type pump as recited in claim 3 wherein said resilient material extends outwardly at a small angle from a flush connection with said outer edge.

5. A seal ring adapted for use in sealing the cylinder of a piston type pump, comprising:

generally cylindrical metal ring having an outer and inner surface and a top and bottom surface for providing a metal-to-metal seal;

generally wedge-shaped surface extending from said top surface to said outer surface of said metal ring;

resilient sealing material bonded to said generally wedge-shaped surface, said resilient sealing material having a lip portion extending radially beyond said outer surface so that it must be compressed against the wall surface of the cylinder head for insertion of the seal and beyond said top surface of said metal ring so that it will be compressed upon axial sealing compression; and said resilient sealing material includes an undercut below said top surface, said undercut terminating on said wedge-shaped surface for receiving said lip portion upon sealing compression of the resilient sealing material to contain the resilient sealing material in axial and radial directions and to provide a positive mechanical seal without any voids unfilled by said sealing resilient material and so that extrusion does not occur as flange cover is tightened against the seal.

6. A seal ring adapted for use in sealing the cylinder of a piston type pump, comprising:

generally cylindrical metal ring having an outer and inner surface and a top and bottom surface for providing a metal-to-metal seal;

generally wedge-shaped surface extending from said top surface to said outer surface of said metal ring;

resilient sealing material bonded to said generally wedge-shaped surface, said resilient sealing material having a lip portion extending radially beyond said outer surface so that it must be compressed against the wall surface of the cylinder head for insertion of the seal and beyond said top surface of said metal ring so that it will be compressed upon axial sealing compression; and said resilient sealing material includes an undercut below said top surface located between lip portion extending beyond said top surface and said wedge-shaped surface, said undercut terminating on said wedge-shaped surface for receiving said lip portion upon sealing compression of the resilient sealing material to contain the resilient sealing material in axial and radial directions, to fill said undercut to form a radial sealing surface when the seal is axially compressed and to provide a positive mechanical seal without any voids unfilled by said sealing resilient material and so that extrusion does not occur as flange cover is tightened against the seal.

7. The seal ring as recited in claim 5 wherein said resilient sealing material extends radially outward at a small angle to a point above said top surface, said resilient sealing material being flush with said outer surface at a point of connection thereto.

8. The seal ring as recited in claim 7 wherein said resilient sealing material has a flat upper surface with an inner edge extending downward at an obtuse angle thereto and terminating through a lower radius approximately perpendicular to said wedge-shaped surface.

* * * * *